United States Patent Office 3,220,473
Patented Nov. 30, 1965

3,220,473
SOLVENT FLOOD OIL RECOVERY METHOD
Le Roy W. Holm, Crystal Lake, Ill., assignor, by mesne assignments, to Union Oil Company of California, Los Angeles, Calif., a corporation of California
No Drawing. Filed Sept. 25, 1961, Ser. No. 140,240
11 Claims. (Cl. 166—9)

This invention relates to an improved method for recovering oil from underground reservoirs. More particularly, this invention relates to an improved secondary recovery process for displacing substantially all of the petroleum oil from an underground formation.

The prior art has disclosed methods for increasing the recovery of oil from petroleum reservoirs by displacing the oil with a solvent which is oil-miscible, and then displacing the solvent with a cheap scavanging fluid which may be left in the reservoir. Water has been employed with considerable success as the scavanging fluid. Liquified petroleum gas, lower aliphatic alcohols and ketones, and other oil-miscible materials have been used as solvents. The prior art has recognized that by employing one or more solvents, which provide a miscible-phase transition from the petroleum oil in the reservoir to the injected floodwater, improved recoveries may be obtained. Unfortunately, such methods fail to recover all of the oil initially present in the reservoir, and frequently further suffer from the disadvantage that substantial quantities of the injected solvents, which are frequently more valuable than the petroleum, are lost in the reservoir and cannot be recovered with the petroleum.

It is, therefore, an object of this invention to provide an improved process for the recovery of petroleum hydrocarbons from underground reservoirs. A second object of this invention is to provide a process by which a greater proportion of the petroleum contained in the reservoir can be recovered. A third object of this invention is to provide a method by which at least most of the injected solvent will be recovered along with the produced petroleum.

Briefly, the method of this invention comprises injecting in sequence into a subterranean formation, which is penetrated by at least one injection well and one producing well, a quantity of a selected ethylene glycol ether, and then injecting floodwater to drive the first injected material towards a producing well. Petroleum is recovered from the producing well in the usual manner. It has been found that exceptionally high oil recoveries are obtained by the method of this invention. It has further been found that a major portion of the injected solvents can be recovered together with the produced petroleum, in contradistinction to prior art, solvent-injection, flood processes wherein a major portion of the injected solvents is lost. The materials suitable for use as the injected solvent are ethylene glycol monopentyl ether, ethylene glycol monohexyl ether, ethylene glycol monoheptyl ether, and ethylene glycol mono-octyl ether. The method of this invention is limited to the use of the four named compounds as the first injected solvent. While many other solvents have been proposed in the prior art, it has been found that only these will give the desired high recovery of petroleum in the process of this invention. Ethylene gylcol monobutyl ether, and lower ethers, have been found to be unsuitable for use in the process, since they provide a total oil recovery about 25% less than that which can be obtained with the monohexyl ether. Similarly, recoveries obtained by the use of compounds higher than the mono-octyl ether provide unsatisfactory results. Of the aforenamed compounds, ethylene glycol monohexyl ether is especially preferred.

It has further been found that the quantity of ethylene glycol ether injected can be reduced if a slug of a water-miscible organic solvent is injected between the ethylene glycol ether and the floodwater. Since there are suitable organic solvents which are less expensive than the ethylene glycol ethers, this modification is preferred.

Numerous water miscible solvents suitable for use as the second injected solvent in the process of this invention are available. Suitable materials are the oxygenated hydrocarbons, such as dimethyl ketone, methyl ethyl ketone, isopropyl alcohol, ethyl alcohol, methyl alcohol, acetaldehyde, and acetone. Of these, especially preferred are isopropyl alcohol and ethyl alcohol. The quantities of ethylene glycol ether and water-miscible solvent injected should be determined after consideration of the characteristics of the reservoir to be treated, but in general both the ethylene glycol ether and water-miscible solvent should be injected in the amounts of about 0.02 to 0.10 reservoir pore volume. In most cases, it is preferred that the quantity of each material be about 0.05 reservoir pore volume. Where the ethylene glycol ether alone is employed, the amount should be about 0.04 to 0.15 reserve pore volume, and preferably about 0.10 reservoir pore volume.

The superiority of the method of this invention has been demonstrated by treating Berea sandstone slabs, 2" x 2" x 12" in dimensions, in accordance with the method of this invention. The slabs, at the start of each experiment, contained 64.5 pore volume of a West Texas crude oil having a viscosity of 4 centipoises, and 35.5% of brine having a salt content of 1.5% by weight. The solvents tested were injected sequentially in the porous medium at a rate of 1 cubic centimeter per minute, and they were driven through the medium by injecting floodwater having a total salt content of 1.5% by weight. In each case, the first injected solvent was followed immediately by the second, and the second was followed immediately by floodwater. The rate of water injection was maintained at approximately 1 cc. per minute. The results of these experiments are set out in Table I.

TABLE I
*Oil recovery from Berea Sandstone*

| Experiment No. | First Solvent Injected | | Second Solvent Injected | | Total Fluid Injected, P.V. | Oil Recovery, Percent O.I.P. | Solvent Recovery at 2 P.V. Total Fluid Injected, Percent of Solvent Injected |
|---|---|---|---|---|---|---|---|
| | Name | Percent P.V. | Name | Percent P.V. | | | |
| 1 | n-Butyl Alcohol | 27 | Ethyl Alcohol | 18 | 1.25 | 81 | |
| 2 | sec-Butyl Alcohol | 27 | ___do___ | 18 | 1.25 | 76 | |
| 3 | n-Amyl Alcohol | 27 | ___do___ | 18 | 1.25 | 93 | 33 |
| 4 | tert.-Butyl Alcohol | 45 | ___do___ | 18 | 1.25 | 79 | |
| 5 | Ethylene Glycol, Monobutyl Ether | 27 | ___do___ | 18 | 1.25 | 77 | |
| 6 | Ethylene Glycol, Monohexyl Ether | 27 | ___do___ | 18 | 0.95 | 100 | 58 |
| 7 | Ethylene Glycol, Monoheyxl Ether | 45 | | | 1.1 | 99+ | 60 |
| 8 | Ethylene Glycol, Monopentyl Ether | 45 | | | 1.1 | 99+ | 83 |
| 9 | Ethylene Glycol, Monobutyl Ether | 45 | | | 1.1 | 84 | 75 |

The ethyl alcohol employed in the experiments contained about 5% of methyl alcohol and a small amount of water. It is contemplated that the ethylene glycol ethers and water-miscible solvents, which will be used as the first and second injected materials in the process of this invention, will be commercial grade materials, rather than pure chemicals. Accordingly, the ethyl alcohol and isopropyl alcohol, for example, may contain small amounts of other alcohols, and may further contain up to about 10% water. Besides the increased oil recovery which results from the practice of this invention, as established in Table I, it was found that in carrying out the method of this invention, as in Experiment 6, 58% of the injected solvent was recovered with the oil phase. In prior art processes, of which Experiment 3 is typical, though excellent in oil-recovery obtained, only about 33% of the injected solvent was recovered with the oil phase.

As a specific example of the method of this invention, a sandstone petroleum reservoir penetrated by five wells in five-spot pattern is produced by injecting into the center well 0.05 reservoir pore volume of ethylene glycol monohexyl ether, and then 0.05 pore volume of isopropyl alcohol. The injected ether and alcohol are driven into the reservoir towards the four producing wells by the injection of floodwater in the conventional manner. The rate of floodwater injection is adjusted to maintain a frontal advance of about 2 feet per day. Petroleum is recovered from the four producing wells until the water-to-oil ratio reaches the value of 10 to 1. At this time, substantially all of the petroleum in the reservoir is recovered, and over 50% of the ethylene glycol monohexyl ether is recovered with the petroleum oil.

The embodiments of the invention in which an exclusive property or privilege is claimed are defined as follows:

1. The method of recovering petroleum from subterranean reservoirs traversed by an injection well and a producing well comprising injecting through said injection well and into said reservoir 0.02 to 0.10 pore volume of materials of the group consisting of ethylene glycol monopentyl ether, ethylene glycol monohexyl ether, ethylene glycol monoheptyl ether, and ethylene glycol mono-octyl ether, thereafter injecting 0.02 to 0.10 pore volume of a water-miscible oxygenated hydrocarbon, driving said injected materials towards the producing well by the injection of floodwater, and recovering petroleum from said producing well.

2. The method in accordance with claim 1 wherein said water-miscible oxygenated hydrocarbon is of the group consisting of isopropyl alcohol, ethyl alcohol, and methyl alcohol.

3. The method in accordance with claim 2 in which the first injected material is ethylene glycol monohexyl ether.

4. The method in accordance with claim 3 in which the ethylene glycol monohexyl ether is injected in the amount of about 0.05 reservoir pore volume.

5. The method in accordance with claim 4 in which said water-miscible oxygenated hydrocarbon is injected in the amount of about 0.05 reservoir pore volume.

6. The method in accordance with claim 5 in which said water-miscible oxygenated hydrocarbon is ethyl alcohol.

7. The method in accordance with claim 5 in which said water-miscible oxygenated hydrocarbon is isopropyl alcohol.

8. The method of recovering petroleum from subterranean reservoirs traversed by an injection well and a producing well comprising injecting through said injection well and into said reservoir 0.04 to 0.15 reservoir pore volume of materials of the group consisting of ethylene glycol monopentyl ether, ethylene glycol monohexyl ether, ethylene glycol monoheptyl, and ethylene glycol mono-octyl ether, driving said materials toward said producing well by the injection of floodwater, and producing petroleum from said producing well.

9. The method in accordance with claim 8 in which amount of said material is about 0.10 reservoir pore volume.

10. The method in accordance with claim 9 in which said material is ethylene glycol monopentyl ether.

11. The method in accordance with claim 9 in which said material is ethylene glycol monohexyl ether.

References Cited by the Examiner

UNITED STATES PATENTS

| | | | |
|---|---|---|---|
| 2,356,205 | 8/1944 | Blair | 252—8.55 |
| 2,742,089 | 4/1956 | Morse | 166—9 |
| 2,987,350 | 1/1961 | Slobod et al. | 166—9 |
| 3,131,759 | 5/1964 | Slusser et al. | 166—42 |

FOREIGN PATENTS 696,524    9/1953   Great Britain.

CHARLES E. O'CONNELL, *Primary Examiner.*

NORMAN YUDKOFF, BENJAMIN HERSH,
*Examiners.*